United States Patent
Yoshikawa et al.

(10) Patent No.: US 10,879,624 B2
(45) Date of Patent: Dec. 29, 2020

(54) WIRELESS COMMUNICATION DEVICE

(71) Applicant: Panasonic Intellectual Property Management Co., Ltd., Osaka (JP)

(72) Inventors: Yoshishige Yoshikawa, Shiga (JP); Takashi Watanabe, Nara (JP); Shota Teramoto, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 83 days.

(21) Appl. No.: 16/307,881

(22) PCT Filed: Aug. 3, 2017

(86) PCT No.: PCT/JP2017/028251
§ 371 (c)(1),
(2) Date: Dec. 6, 2018

(87) PCT Pub. No.: WO2018/043027
PCT Pub. Date: Mar. 8, 2018

(65) Prior Publication Data
US 2019/0190164 A1   Jun. 20, 2019

(30) Foreign Application Priority Data
Sep. 1, 2016   (JP) ................. 2016-170422

(51) Int. Cl.
*H01Q 21/24* (2006.01)
*H04B 7/10* (2017.01)
(Continued)

(52) U.S. Cl.
CPC ............ *H01Q 21/24* (2013.01); *G01F 1/00* (2013.01); *G01F 15/063* (2013.01); *G08C 17/00* (2013.01);
(Continued)

(58) Field of Classification Search
CPC .. H01Q 1/2233; H01Q 21/0006; H01Q 21/24; H01Q 21/29; H01Q 21/293
See application file for complete search history.

(56) References Cited

U.S. PATENT DOCUMENTS

| | | | |
|---|---|---|---|
| 2010/0253538 A1* | 10/2010 | Smith | H01Q 1/2233 340/870.02 |
| 2012/0313824 A1 | 12/2012 | Watanabe et al. | |
| 2019/0252769 A1* | 8/2019 | Yoshikawa | H04B 1/0458 |

FOREIGN PATENT DOCUMENTS

| | | |
|---|---|---|
| CN | 104335506 A | 2/2015 |
| CN | 204202677 U | 3/2015 |

(Continued)

OTHER PUBLICATIONS

Extended European Search Report dated Jul. 19, 2019 issued in corresponding European Patent Application No. 17846036.6.

(Continued)

*Primary Examiner* — Daniel Munoz
(74) *Attorney, Agent, or Firm* — McDermott Will & Emery LLP (57) ABSTRACT

A wireless communication device includes: flow-rate measuring unit connected to fluid pipe; and first antenna element that transmits and receives a radio wave. First antenna element has a longer side orthogonal to an axis of fluid pipe. According to this configuration, a direction of a plane of polarization of a radio wave radiated from first antenna element is orthogonal to fluid pipe. Thus, the radio wave is not reflected by fluid pipe but propagates in a direction toward fluid pipe, namely, in a rear surface direction of a meter including the wireless communication device.

7 Claims, 4 Drawing Sheets

(51) Int. Cl.
*G01F 1/00* (2006.01)
*G08C 17/00* (2006.01)
*H04B 1/38* (2015.01)
*H01Q 1/22* (2006.01)
*H01Q 9/42* (2006.01)
*G01F 15/06* (2006.01)
*G08C 17/02* (2006.01)
*H01Q 21/00* (2006.01)
*G01D 4/00* (2006.01)
*G01F 1/66* (2006.01)

(52) U.S. Cl.
CPC ........... *G08C 17/02* (2013.01); *H01Q 1/2233* (2013.01); *H01Q 9/42* (2013.01); *H01Q 21/0006* (2013.01); *H04B 1/38* (2013.01); *H04B 7/10* (2013.01); *G01D 4/002* (2013.01); *G01F 1/66* (2013.01)

(56) References Cited

FOREIGN PATENT DOCUMENTS

| | | |
|---|---|---|
| EP | 1 168 658 A1 | 1/2002 |
| EP | 2876821 A1 | 5/2015 |
| JP | 63-318826 A | 12/1988 |
| JP | H06-351074 A | 12/1994 |
| JP | 9-027092 A | 1/1997 |
| JP | H11-112223 A | 4/1999 |
| JP | 2002-109672 A | 4/2002 |
| JP | 2004-328666 A | 11/2004 |
| JP | 2009-253788 A | 10/2009 |
| WO | 2005/091433 A1 | 9/2005 |

OTHER PUBLICATIONS

English Translation of Chinese Search Report dated Mar. 3, 2020 for the related Chinese Patent Application No. 201780035348.6.

* cited by examiner

WIRELESS COMMUNICATION DEVICE

This application is a U.S. national stage application of the PCT International Application No. PCT/JP2017/028251 filed on Aug. 3, 2017, which claims the benefit of foreign priority of Japanese patent application No. 2016-170422 filed on Sep. 1, 2016, the contents all of which are incorporated herein by reference.

TECHNICAL FIELD

The present invention relates to a wireless communication device to be equipped inside a flow-rate measuring device, such as a gas meter, in order to provide a wireless communication function. The present invention features an antenna structure and a control method.

BACKGROUND ART

Gas meters are used to measure the amounts of gas supplied to houses and factories. In Japan, gas meters with a microcomputer, called gas microcomputer meters, have been utilized for about 30 years. The gas microcomputer meters aim to prevent gas leakages from causing gas accidents, such as explosion and poisoning, and continue to monitor gas flow rates. Utilizing the gas microcomputer meters contributes to a great reduction in the number of gas accidents.

Gas meters with a wireless terminal, called wireless automatic gas meter reading systems, have been utilized for about 20 years. The wireless automatic gas meter reading systems realize functions of automatically reading the amounts of gas and allowing a gas company center to remotely close shutoff valves in the gas meters. A wireless automatic gas meter reading system uses its wireless terminal to conduct low-power wireless communication with a host machine installed on a roof of a building or a utility pole. In Japan, at this time, gas meters can be implemented by smart meters. In a conventional system, one host machine needs to be installed in relation to about 100 gas meters. Thus, difficulty in finding installation sites of host machines and maintenance costs of the host machines may be problematic.

Outside Japan, gas meters are also increasingly implemented by smart meters. Such gas meters have a built-in electronic device (microcomputer) and conduct wireless communication. In some European countries, for example, gas meters employ a radio frequency of 169 MHz and a transmission power of 500 mW in order to extend their communication distance. In contrast, in Japan, the radio frequency is 429 MHz and the transmission power is 10 mW. This configuration enables one host machine to accommodate many more meters. In fact, one host machine accommodates about 4,000 meters. Thus, the configuration successfully greatly decreases the number of host machines installed.

Another conceivable solution to the difficulty in installing host machines is using a system that requires no host machines. More specifically, in this system, gas meters communicate with one another in a bucket brigade manner via their built-in radio devices. In this case, the gas meters constitute a so-called mesh network (conducting a mesh communication). The system advantageously requires no host machines that would be installed on the roof and utility poles.

Under the above circumstances, some other methods of mounting an antenna inside a gas meter have already been proposed (e.g. refer to PTLs 1 and 2).

CITATION LIST

Patent Literature

PTL 1: Unexamined Japanese Patent Publication No. 2009-253788
PTL 2: Unexamined Japanese Patent Publication No. 2002-109672

SUMMARY OF THE INVENTION

However, conventional configurations as discussed above may have some disadvantages that will be described below. In other words, mounting a radio antenna inside a meter may cause some disadvantages that will be described below.

1) Limitation on Antenna Size

There is a limitation on a meter size. More specifically, it is difficult to enlarge a built-in antenna in order to enhance its performance. Thus, it is necessary to maximize the performance of an antenna under a restrictive size condition. In addition to an antenna element, a ground pattern on a circuit board plays an important role in antenna radiation. It is necessary to consider a ground pattern on a circuit board in order to enhance a performance of an antenna.

2) Asymmetry of Antenna Radiation Directivity

Gas meters usually have a metal housing with its front side open. When an antenna is disposed closer to this front side, its radiation directivity pattern tends to be stronger in the forward direction but weaker in the backward, right, and left directions. When communication is conducted on a mesh network as described above, it may be impossible to determine a relative positional relationship between meters. Therefore, each meter preferably possesses antenna radiation directivity such that it is possible to isotropically receive radio waves coming from all directions. As described above, however, mounting an antenna inside a meter may cause asymmetric radiation directivity (increase radiation in the forward direction).

3) Severe Multipath Fading Environment for Wireless Communication Between Gas Meters In a building such as an apartment or a condominium, for example, gas meters are each disposed in a small space surrounded by concrete walls, called pipe shafts. The meters wirelessly communicate with one another with a plurality of concrete walls therebetween. This means that the communication is conducted under a severe environment in which radio waves are attenuated and multipath waves are coming. As a result, the strength of the received electric field may decrease locally (multipath fading may occur), thereby inhibiting a required strength of the received electric field from being obtained. PTL 2 discloses a diversity antenna system including a plurality of antennas, which avoid a local decrease in the received electric field strength.

A wireless communication device of the present invention includes: a flow-rate measuring unit connected to a fluid pipe; and a first antenna element that transmits and receives a radio wave. The first antenna element has a longer side orthogonal to an axis of the fluid pipe.

With this configuration, the wireless communication device of the present invention can isotropic radiation directivity in all directions. In addition, the wireless communication device can conduct stable communication, especially on a mesh network via which wireless communication devices communicate with one another.

DESCRIPTION OF EMBODIMENTS

Exemplary embodiments of the present invention will be described below with reference to the accompanying drawings. However, it should be noted that the present invention is not limited to the exemplary embodiments.

First Exemplary Embodiment

Hereinafter, as an example, a wireless communication device according to a first exemplary embodiment of the present invention is mounted in a flow-rate measuring device having a flow-rate measuring unit. However, as another example, the wireless communication device in the present exemplary embodiment may be mounted in a wireless fire alarm, a wireless gas alarm, a handy terminal, and other electronic instruments. A gas meter will be described as an example of the flow-rate measuring device in which the wireless communication device of the present exemplary embodiment is mounted. However, the wireless communication device is also applicable to a water meter and other flow rate meters.

Wireless communication devices of the present exemplary embodiment preferably configure a so-called mesh network (mesh communication). Via this mesh network, the wireless communication devices do not directly communicate with a host machine but communicate with one another in a bucket brigade manner.

A reason why the mesh network configuration is preferable will be described below. Communication between the wireless communication devices cannot rely on a wireless communication performance of a host machine. To reliably expand the communication, it is necessary to maximally improve a wireless communication performance of each wireless communication device. However, the mesh communication involves an increasing number of communications between the wireless communication devices. When each wireless communication device outputs a signal at high transmission power, the power consumption of the wireless communication device increases. To ensure a considerably long communication distance, therefore, it is better to improve a performance of each radio antenna rather than to increase the transmission power. In short, for the wireless communication devices configuring the mesh network, the improvement in the performance of the radio antennas of the wireless communication devices is more significant. For this reason, the mesh network is preferably configured with the wireless communication devices of the present exemplary embodiment in which the performance of the radio antennas of the wireless communication devices is improvable.

Figure 1:
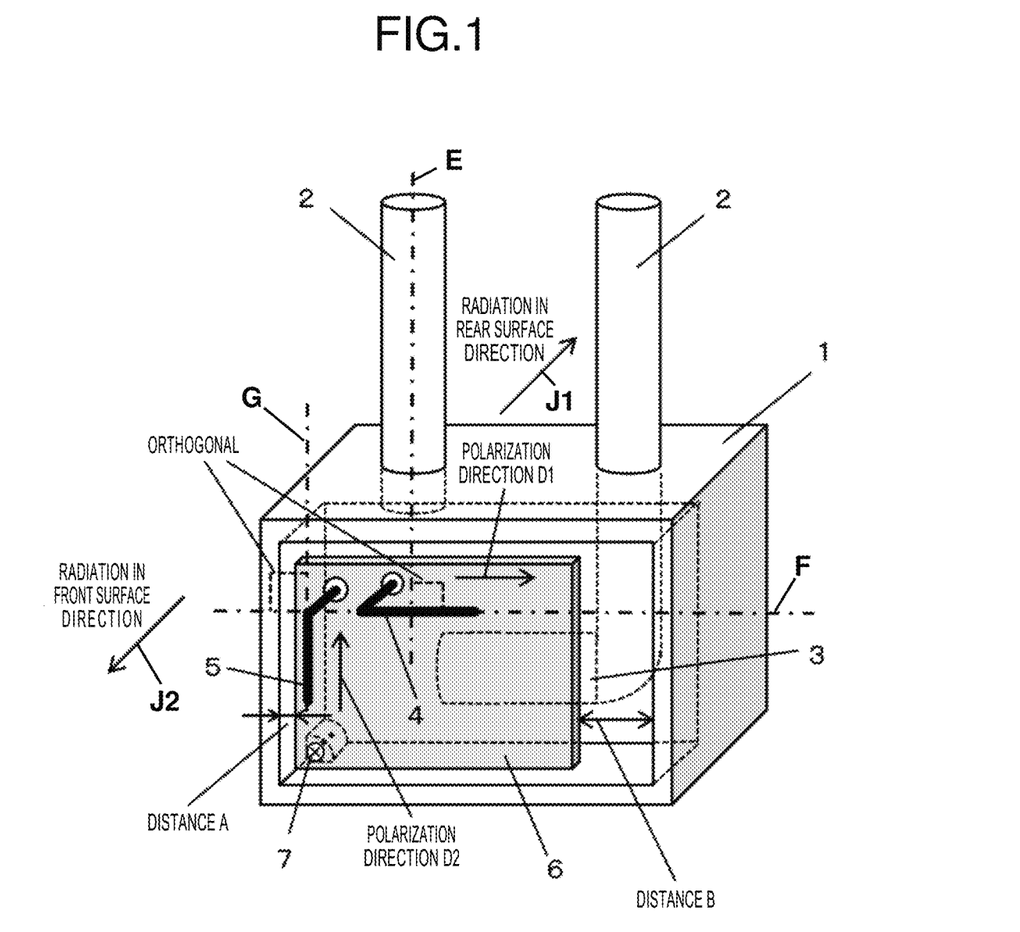
FIG. 1 illustrates an outer configuration of a wireless communication device according to a first exemplary embodiment of the present invention.

FIG. 1 illustrates an outer configuration of a wireless communication device according to the present exemplary embodiment. In FIG. 1, the wireless communication device includes housing 1, fluid pipes 2, flow-rate measuring unit 3, first antenna element 4, second antenna element 5, circuit board 6, and node 7. In the description of the present exemplary embodiment, the term "upper surface side" corresponds to an upper side of the page of FIG. 1, "front surface side" corresponds to a front side of the page of FIG. 1, and "rear surface side" corresponds to a depth side of the page of FIG. 1.

Housing 1 is a box-shaped structure and forms an outer surface of a gas meter or other flow-rate measuring devices. Housing 1 is formed by die-casting an aluminum plate or pressing a steel plate. Housing 1 has a cavity in which a fluid flows.

Two fluid pipes 2 (gas pipes in the configuration illustrated in FIG. 1) are connected to one surface (upper surface in FIG. 1) of housing 1. Fluid pipes 2 penetrate housing 1 and are joined to a pipe through which the fluid is introduced into housing 1. Of two fluid pipes 2, one is disposed on a flow-in side of a fluid and the other is disposed on a flow-out side of the fluid. Flow-rate measuring unit 3 is connected to fluid pipe 2 disposed on the flow-in side of the fluid.

Flow-rate measuring unit 3 measures a velocity of the fluid with an ultrasound scheme and then integrates the velocity of the fluid. In this way, flow-rate measuring unit 3 continues to determine a volume, or a flow rate, of the fluid. After passing through flow-rate measuring unit 3, the fluid is discharged to within the cavity of housing 1 and flows out to fluid pipe 2 disposed on the flow-out side.

Housing 1 has a recess in one surface (front surface in FIG. 1) of housing 1. The recess has an opening in one surface (front surface in FIG. 1) of the recess. Circuit board 6 on which an electronic circuit is formed is mounted in the recess. Circuit board 6 is formed by creating wires on a surface of a glass epoxy resin substrate with copper foil patterns and mounting circuit components on the surface. Mounted on circuit board 6 are a wireless circuit, an arithmetic circuit (microcomputer) that analyzes flow rate data, and liquid crystal display components, for example.

Furthermore, first antenna element 4 and second antenna element 5 are mounted on circuit board 6. Each of first antenna element 4 and second antenna element 5 acts as an antenna. Each of first antenna element 4 and second antenna element 5 is an inverted L-shaped antenna element, which is formed by bending a metal wire into an L shape. Using first antenna element 4 and second antenna element 5 preferably constitutes a diversity antenna. In the diversity antenna, first antenna element 4 and second antenna element 5 are mutually switched so as to optimize a reception state and a transmission state.

As illustrated in FIG. 1, first antenna element 4 is disposed with a longer side of first antenna element 4 extending along line F, which is orthogonal to axis E of each fluid pipe 2. Line F extends horizontally in FIG. 1, and axis E is denoted by an alternate long and short dash line illustrated in a center of a pipe in FIG. 1.

First antenna element 4 is mounted on circuit board 6 and provided on a side (upper side in FIG. 1) of circuit board 6 which is closer to a surface (upper surface in FIG. 1) of housing 1 which fluid pipes 2 penetrate.

By disposing first antenna element 4 closer to fluid pipes 2, an electromagnetic wave radiated from first antenna element 4 propagates strongly in a direction orthogonal to the longer side of first antenna element 4. Since the longer side of first antenna element 4 is orthogonal to the axis of each fluid pipe 2, polarization direction D1, which is a direction of a plane of polarization of the electromagnetic wave, is orthogonal to axis E of each fluid pipe 2 (namely, a longer side of each fluid pipe). An electric field of the incoming electromagnetic wave is applied to fluid pipes 2 in a radial direction, but only a small amount of excited high-frequency reverse current flows through each fluid pipe 2, because each fluid pipe 2 is smaller in the radial direction than in the axial direction. Therefore, the electromagnetic wave passes through fluid pipes 2 and propagates to the rear of housing 1 (in a direction denoted by arrow J1, which is illustrated as radiation toward the rear surface side in FIG. 1).

The electromagnetic wave is radiated from first antenna element 4 in a front surface direction (direction of arrow J2), a rear surface direction (direction of arrow J1), and right and left directions of housing 1. In this case, the electromagnetic wave radiated in the rear surface direction may be reflected by fluid pipes 2, which are metal pipes, and then propagates in the front surface direction. As a result, the electromagnetic wave propagating in the rear surface direction may be disadvantageously attenuated. In the present exemplary embodiment, however, first antenna element 4 disposed in the above manner possesses antenna radiation directivity such that the electromagnetic wave propagates strongly in the rear surface direction of housing 1. In short, first antenna element 4 possesses isotropic antenna radiation directivity.

Second antenna element 5 is disposed with a longer side of second antenna element 5 extending along line G, which is orthogonal to the longer side (line F) of first antenna element 4. Thus, second antenna element 5 is disposed in parallel to axis E of each fluid pipe 2. As a result, polarization direction D2, which is a direction of a plane of polarization of an electric field, of an electromagnetic wave radiated from second antenna element 5 is parallel to the axis (line G) of each fluid pipe 2. In this case, excited, high-frequency current flows on the surface of each fluid pipe 2 in a direction in which the electromagnetic wave from second antenna element 5 is cancelled out. Thus, the electromagnetic wave from second antenna element 5 is reflected by fluid pipes 2 and then propagates in the front surface direction (denoted by arrow J2) of housing 1. Thai is, the radiation of the electromagnetic wave decreases in the rear surface direction (denoted by arrow J1) of housing 1 but increases in the front surface direction (denoted by arrow J2).

As described above, first antenna element 4 and second antenna element 5 greatly differ in characteristic of radiation directivity pattern from each other. When first antenna element 4 and second antenna element 5 are used to constitute a diversity antenna, the two antennas preferably greatly differ in radiation directivity characteristics in terms of diversity gain. This means that two antennas, the directivity characteristics of which have a weaker correlation, successfully possess a higher diversity gain.

In the present exemplary embodiment, first antenna element 4 and second antenna element 5 are positioned orthogonally. First antenna element 4 is positioned at a right angle with respect to fluid pipes 2, and second antenna element 5 is positioned in parallel to fluid pipes 2. This configuration successfully and reliably increases the radiations of electromagnetic waves in the rear surface direction of housing 1. The configuration also advantageously increases a diversity gain of a diversity antenna.

Figure 2A:
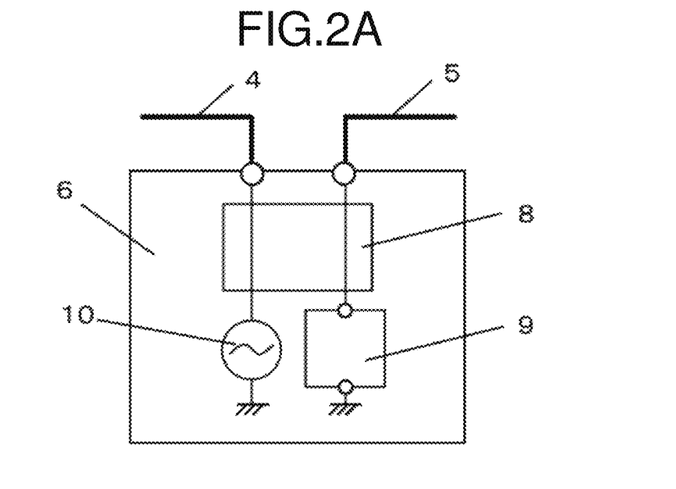
FIG. 2A illustrates a configuration of a switch, which is a component of the wireless communication device according to the first exemplary embodiment of the present invention.
Figure 2B:
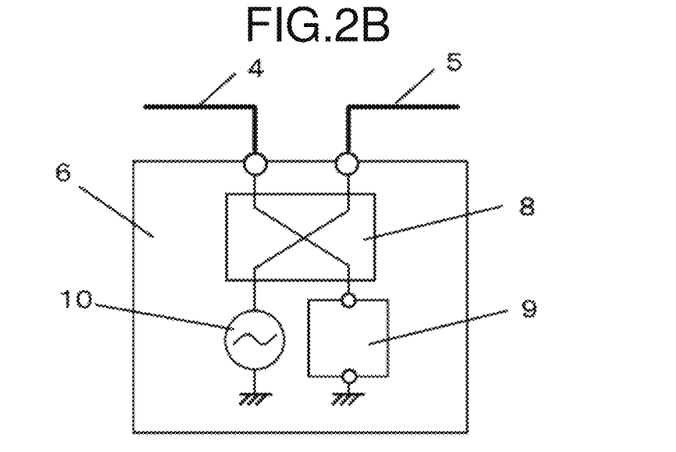
FIG. 2B illustrates the configuration of the switch, which is a component of the wireless communication device according to the first exemplary embodiment of the present invention.
Figure 2C:
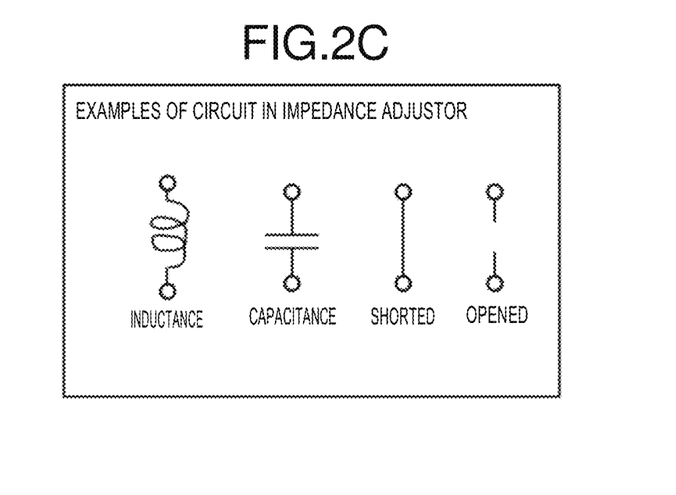
FIG. 2C illustrates an example of a circuit of an impedance adjustor in the switch, which is a component of the wireless communication device according to the first exemplary embodiment of the present invention.

FIGS. 2A to 2C each illustrate a configuration of a switch that switches between antennas, which is disposed in a diversity antenna of the wireless communication device according to the present exemplary embodiment. First antenna element 4 and second antenna element 5 are connected at first ends of first antenna element 4 and second antenna element 5 to respective two antenna terminals of switch 8. Of the two remaining terminals of switch 8, one is connected to a high frequency terminal of wireless circuit 10 and the other is connected to the ground of circuit board 6 via impedance adjustor 9. Switch 8 switches between states illustrated in FIGS. 2A and 2B.

In FIG. 2A, switch 8 performs the switching such that first antenna element 4 is connected to the high frequency terminal of wireless circuit 10 and second antenna element 5 is connected to the ground of circuit board 6 via impedance adjustor 9. In FIG. 2B, switch 8 performs the switching such that first antenna element 4 is connected to the ground of circuit board 6 via impedance adjustor 9 and second antenna element 5 is connected to the high frequency terminal of wireless circuit 10.

A typical diversity antenna switches between two antennas to perform transmission and reception operations. Impedance adjustor 9 plays a role in placing a load (impedance) on the antenna that is not connected to wireless circuit 10.

First antenna element 4 and second antenna element 5 constitute a single antenna assembly. When electric power is supplied to one of antenna element 4 and second antenna element 5, the antenna assembly operates like a dipole antenna on the whole. In this case, when feeding points of the two antenna elements (first antenna element 4 and second antenna element 5) are disposed closer to each other, the other of first antenna element 4 and second antenna element 5 needs to be connected directly to the ground.

In many actual configurations, however, the feeding points of the two antenna elements are positioned somewhat away from each other. As a result, the two antennas operate with their phases not reversed due to spatial phase delay. To correct this phase difference, impedance adjustor 9 is provided, ensuring an antenna performance.

As illustrated in FIG. 2C, impedance adjustor 9 can have one of circuit constants: inductance, capacitance, shorted, and opened. In terms of which constant is to be used, impedance adjustor 9 may use an optimum constant in consideration of a distance between the antenna elements, a relative angle between the antennas, an influence of excited, high-frequency current on a circuit board, and other factors.

A distance between the feeding points of first antenna element 4 and second antenna element 5 is preferably set to be less than or equal to one fourth, more specifically, one eighth of a wavelength of the electromagnetic wave output from first antenna element 4 or second antenna element 5. Setting the distance in this manner and disposing their feeding points closer to each other, the two antenna elements can easily operate like a dipole antenna.

Wireless circuit 10 corresponds to a feed circuit of the present invention and is a circuit that supplies high-frequency power to one of first antenna element 4 and second antenna element 5.

As illustrated in FIG. 1, a ground pattern of circuit board 6 is electrically connected to housing 1 at a single point, namely, at node 7. More specifically, circuit board 6 is fixed to housing 1 only by a metal bolt penetrating node 7.

By using single node 7, high-frequency current excited by first antenna element 4 and second antenna element 5 flows on the surface of circuit board 6. Then, the high-frequency current excites high-frequency voltage amplitude on circuit board 6. This is because the ground pattern of circuit board 6 is free from the ground of housing 1 made of a metal. In this case, circuit board 6 acts as a sort of antenna element for housing 1. As a result, entire circuit board 6 radiates a radio wave, thereby improving an antenna radiation efficiency of the entire wireless communication device, including first antenna element 4, second antenna element 5, and circuit board 6.

When an antenna is disposed on a front surface of housing 1 made of a metal, the radiation efficiency tends to decrease due to an influence of housing 1. However, this configuration causes the entire wireless communication device, including circuit board 6, to act as an antenna, thereby increasing the radiation efficiency.

As illustrated in FIG. 1, distance A is set to be smaller than distance B. Distance A is secured between a end of circuit board 6 on which the feeding points of first antenna element 4 and second antenna element 5 are positioned (the left end of circuit board 6 in FIG. 1) and an end of the opening in housing 1. Distance B is secured between an end of circuit board 6 on which the feeding points of first antenna element 4 and second antenna element 5 are not positioned (the right end of circuit board 6 in FIG. 1) and an end of the opening in housing 1. Larger distance B can make radiation efficiency of the antenna higher.

A reason for this will be described below. The high-frequency voltage amplitude excited on circuit board 6 by first antenna element 4 and second antenna element 5 becomes the greatest at a location farthest away from the feeding points. This farthest location is closer to the right side of circuit board 6 (distance B) illustrated in FIG. 1. If the opening of housing 1 is closer to an end of circuit board 6 at the location farthest from the feeding points, high-frequency reverse current may be excited closer to the opening and then cancel out the high-frequency voltage amplitude and high-frequency current on circuit board 6. This might decrease the radiation efficiency of the antenna, including circuit board 6. In the present exemplary embodiment, however, a large distance B is reserved between the opening of housing 1 and the end of circuit board 6 at the farthest location. This configuration can decrease the excited, high-frequency reverse current flowing on the surface of housing 1 closer to the opening, thereby increasing the radiation efficiency of the antenna.

In the present exemplary embodiment, circuit board 6 is mounted in the opening formed in the front surface of housing 1; however, circuit board 6 may be embedded in housing 1 made of a metal, and only antenna elements may be disposed on the front surface of housing 1. In this configuration, two antenna elements are also disposed closer to fluid pipes 2, and the longer side of one of the antenna elements is disposed vertically to the axis of each fluid pipe. As a result, the electromagnetic wave is effectively radiated in the rear surface direction.

The antenna element arrangement employs inverted L-shaped antennas; however, this antenna element arrangement may employ any given antennas, such as inverted F-shaped antennas or patch antennas. In this case, the antenna element arrangement may be designed such that a direction of a plane of polarization of a radio wave radiated from a first antenna element (not illustrated) is orthogonal to the axis of each fluid pipe 2 and such that a direction of a plane of polarization of a radio wave radiated from a second antenna element (not illustrated) is orthogonal to the direction of the plane of polarization of the radio wave radiated from the first antenna element and parallel to the axis of each fluid pipe 2.

The rear surface of circuit board 6 is preferably positioned at a predetermined distance away from the bottom of the recess of housing 1. More specifically, a distance between the rear surface of circuit board 6 and the bottom of the recess of housing 1 may be set to be equal to or more than one sixteenth, more preferably, one thirty-second of a wavelength of an electromagnetic wave output from each antenna element. Setting the distance in this manner can suppress the excited reverse current flowing in housing 1 from affecting a high-frequency amplitude activated on circuit board 6.

Furthermore, first antenna element 4 is disposed on circuit board 6 closer to fluid pipes 2. More specifically, a distance between each fluid pipe 2 and first antenna element 4 is preferably set to be less than or equal to one half, more specifically, one fourth of the wavelength of the electromagnetic wave output from each antenna element. By disposing first antenna element 4 closer to fluid pipes 2, a radio wave radiated from first antenna element 4 to fluid pipes 2 can be increased.

The antenna arrangement of the wireless communication device according to the present exemplary embodiment is effective, especially when the wireless communication device is used on a mesh network via which terminals directly communicate with one another. On the mesh network, a first wireless communication device has difficulty determining a direction of a second wireless communication device that is communicating with the first wireless communication device. For this reason, the wireless communication device preferably radiates a radio wave with isotropic directivity in all directions. In the present exemplary embodiment, the radio wave passes through the fluid pipes and propagates in the rear surface direction. As a result, the wireless communication device successfully possesses isotropic radiation directivity in all directions.

The wireless communication device is effective when the radio frequency of the wireless communication device is set to within a sub-GHz band, namely, to about 900 MHz. When the frequency is 900 MHz, its wavelength is about 32 cm. Thus, when the length of the antenna element is set to about one fourth of the wavelength, a great resonance occurs, thereby improving the antenna performance. Here, one fourth of the wavelength is about 8 cm, which is slightly smaller than the outline of housing 1. Thus, optimum antenna elements can be mounted inside housing 1. By further increasing the frequency, antenna elements can be downsized. However, the antenna elements are far away from the fluid pipes on a wavelength scale. In this case, the radio wave radiated from each antenna element to the fluid pipes is attenuated, which lessens the effect of radiating the radio wave in the rear surface direction of the housing. In addition, the radio wave exhibits a directivity characteristic in which a radio wave propagating in the front surface direction of the housing increases. As described above, the radio frequency is preferably set to about 900 MHz. If the radio frequency is shifted from 900 MHz, the effect tends to be lessened.

In this example, the longer side of first antenna element 4 is disposed so as to be orthogonal to each fluid pipe; however, an angle between the longer side and each fluid pipe may be slightly shifted from 90 degrees. More specifically, the wireless communication device can produce a sufficient effect unless the angle falls outside the range from about 70 degrees to about 110 degrees. In the present exemplary embodiment, the term "orthogonal" should not be interpreted in a limited manner, and may imply "intersecting at an angle ranging from 70 degrees to 110 degrees".

Second Exemplary Embodiment

Figure 3:
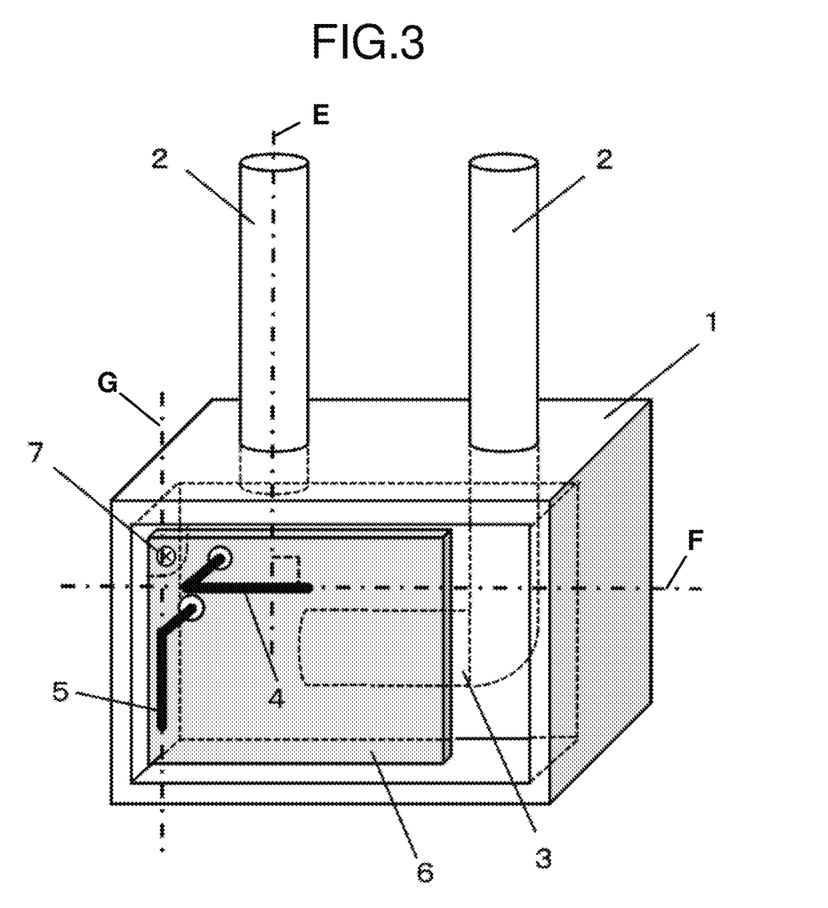
FIG. 3 illustrates an outer configuration of a wireless communication device according to a second exemplary embodiment of the present invention.

FIG. 3 illustrates an outer configuration of a wireless communication device according to a second exemplary embodiment of the present invention. In FIG. 3, the same component numbers are assigned to the same components as those in the first exemplary embodiment, and a description thereof will be omitted.

The present exemplary embodiment differs from the first exemplary embodiment, in a position of node 7. Similar to the first exemplary embodiment, first antenna element 4 and second antenna element 5 are disposed on circuit board 6, as illustrated in FIG. 3. In the present exemplary embodiment, however, node 7 of the ground pattern on circuit board 6 is positioned between and closer to the feeding points of first antenna element 4 and second antenna element 5. Node 7 is connected to the ground of housing 1.

At each feeding point, the high-frequency voltage amplitude becomes the smallest, and the high-frequency current has the greatest intensity. The ground pattern on circuit board 6 is connected at a location closer to the point at which the high-frequency current has the greatest intensity to housing 1. The high-frequency current is thereby supplied to housing 1 effectively. The high-frequency current that has been fed to housing 1 excites high-frequency voltage. As a result, housing 1 acts as a part of the antenna, thereby improving the radiation efficiency.

Node 7 is preferably positioned between and closer to the feeding points of first antenna element 4 and second antenna element 5. More specifically, a distance between node 7 and each of the feeding points of first antenna element 4 and second antenna element 5 is preferably set to be less than or equal to one fourth, more preferably, one eighth of a wavelength of an electromagnetic wave emitted from each antenna element.

This configuration enables circuit board 6 to be connected at a ground point closer to the feeding points at which the high-frequency voltage amplitude becomes the smallest (the current amplitude becomes the greatest) to housing 1. Thus, circuit board 6 is not connected at a point closer to ends of first antenna element 4 and second antenna element 5 at which the high-frequency voltage amplitude becomes the greatest (points farthest away from the feeding points) to the housing 1. Thus, the configuration can increase the high-frequency voltage amplitude excited on circuit board 6.

The configuration of the present exemplary embodiment provides radiation of a radio wave from first antenna element 4 and second antenna element 5, as well as radiation of a radio wave from the ground pattern of circuit board 6 and housing 1. Consequently, it is possible to improve the radiation efficiency of the antenna.

Third Exemplary Embodiment

Figure 4:
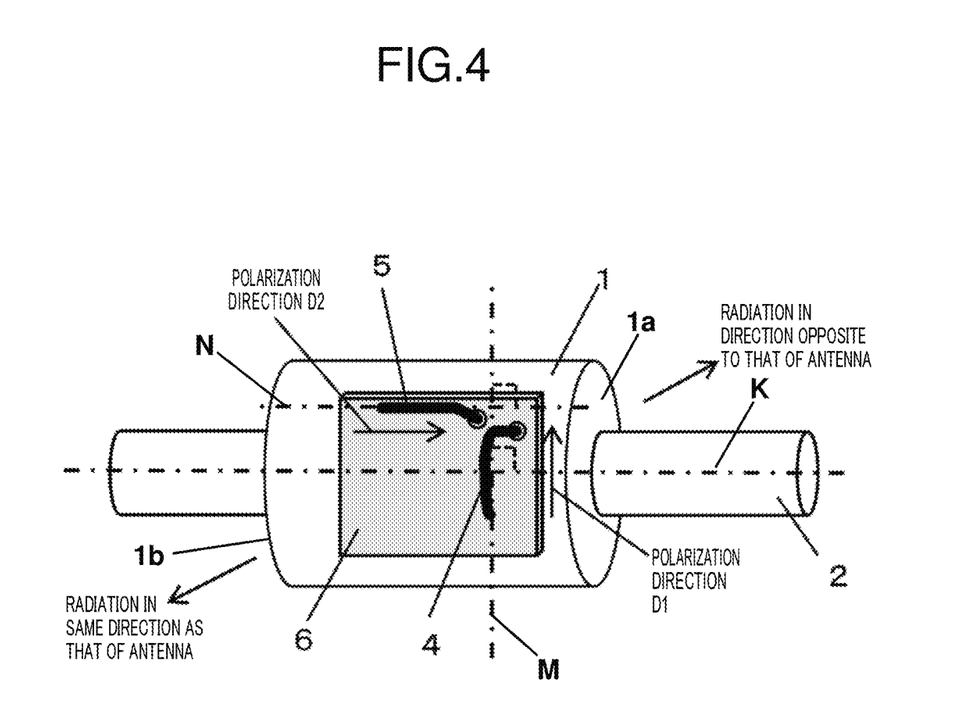
FIG. 4 illustrates an outer configuration of a wireless communication device according to a third exemplary embodiment of the present invention.

FIG. 4 illustrates an outer configuration of a wireless communication device according to a third exemplary embodiment of the present invention. In FIG. 4, the same component numbers are assigned to the same components as those in the first and second exemplary embodiments, and a description thereof will be omitted.

The present exemplary embodiment differs from the first and second exemplary embodiments, in deposition of housing 1 and fluid pipe 2.

In the present exemplary embodiment, housing 1 has a cylindrical structure, as illustrated in FIG. 4. One end of fluid pipe 2 vertically penetrates first circle plane 1a of housing 1, whereas the other end of fluid pipe 2 vertically penetrates second circle plane 1b of housing 1. In short, a wireless communication device of the present exemplary embodiment has a configuration in which antennas are mounted in a flow rate meter of a linear tubular shape.

First antenna element 4 and second antenna element 5 are formed on circuit board 6 mounted in housing 1. First antenna element 4 is disposed closer to fluid pipe 2 so as to extend along line M, which is orthogonal to axis K of fluid pipe 2. Second antenna element 5 is disposed so as to be orthogonal to first antenna element 4 and extends along line N, which is parallel to the axis of fluid pipe 2.

In the present exemplary embodiment, a radio wave radiated from first antenna element 4 propagates in a direction from first antenna element 4 to housing 1 without being affected by fluid pipe 2. A radio wave radiated from second antenna element 5 is reflected by fluid pipe 2 and strongly propagates in a direction from housing 1 to second antenna element 5. Thus, first antenna element 4 and second antenna element 5 differ from each other in radiation directivity characteristic, thereby providing a diversity antenna with a high gain.

The present exemplary embodiment is effective in mounting an antenna in a flow rate meter of a linear tubular shape. This linear tubular shape looks good in appearance. In addition, this structure allows a flow rate meter to be disposed linearly at a midpoint of the pipe, making the layout of the fluid pipe simpler.

In the present exemplary embodiment, the fluid meter of a linear tubular shape includes housing 1 of a cylindrical shape; however, the fluid meter may be applicable to housing 1 having any other shape. In short, housing 1 may have any given shape as long as first antenna element 4 is disposed so as to be orthogonal to the longer side of the fluid pipe.

As described above, the wireless communication device of a first invention includes: a flow-rate measuring unit connected to a fluid pipe; and a first antenna element that transmits and receives a radio wave. The first antenna element has a longer side orthogonal to an axis of the fluid pipe.

According to this configuration, a direction of a plane of polarization of a radio wave radiated from the first antenna element is orthogonal to the fluid pipe. Thus, the radio wave is not reflected by the fluid pipe but propagates in a direction toward the fluid pipe, namely, in the rear surface direction of a meter including the wireless communication device.

A wireless communication device of a second invention may have the configuration of the first invention and include: a housing that accommodates the flow-rate measuring unit; and a circuit board including the first antenna element. The housing has a surface that the fluid pipe penetrates. The first antenna element is positioned on a side of the circuit board which is closer to the surface of the housing which the fluid pipe penetrates.

According to this configuration, the antenna element disposed on the circuit board can be effectively mounted inside the meter including the wireless communication device. This antenna element can radiate a radio wave in the rear surface direction of the meter.

A wireless communication device of a third invention may have, in addition to the configuration of the first or second invention, a configuration in which the circuit board includes a second antenna element that has a longer side orthogonal to the longer side of the first antenna element.

According to this configuration, a direction of a plane of polarization of a radio wave radiated from the second antenna element is orthogonal to the direction of the plane of polarization of the radio wave radiated from the first antenna element. The configuration thereby can provide a two-branched diversity antenna with an improved diversity gain.

The first antenna element also possesses radiation directivity such that the radio wave propagating in the rear surface direction of the meter increases. In contrast, the second antenna element possesses radiation directivity such that the radio wave propagating in the front surface direction of the meter including the wireless communication device increases. This is because the direction of the plane of polarization of the radio wave radiated from the second antenna element is parallel to the fluid pipe. Thus, this radio wave causes a high-frequency current to flow along the fluid pipe in a direction in which the radiation is cancelled out. The radio wave is thereby reflected. In short, the first antenna element differs from the second antenna element in antenna radiation directivity. By reducing the degree of correlation between both antenna radiation directivities, the diversity gain of the two-branched diversity antenna can be further improved.

A wireless communication device of a fourth invention may have the configuration of the third invention and include: a feed circuit that supplies high-frequency power to one of the first antenna element and the second antenna element; and a switch that electrically connects the one of the first antenna element and the second antenna element to the feed circuit and electrically connects an other of the first antenna element and the second antenna element to ground.

According to this configuration, the antenna element connected to the ground acts as a dummy ground line, in which case an electric field is generated between the power-supplied and grounded antenna elements. The two antenna elements collaborate to operate like a single dipole antenna.

According to the configuration, the high-frequency current concentrates on the two antenna elements. As a result, only small amounts of excited, high-frequency currents flow in the circuit board, various components on the circuit board, a wire harness connected to the circuit board, and other periphery parts. Consequently, resistance components of the periphery parts consume the high-frequency energy, thereby suppressing a decrease in the radiation efficiency of the antenna.

A wireless communication device of a fifth invention may have the configuration of the third invention and include: a feed circuit that supplies high-frequency power to one of the first antenna element and the second antenna element; and one of the first antenna element and the second antenna element is electrically connected to the feed circuit, and an other of the first antenna element and the second antenna element is electrically connected to ground via an impedance adjustor.

According to this configuration, even when a feeding point of the first antenna element is somewhat away from a feeding point of the second antenna element, the impedance adjustor adjusts the phase relationship, thereby causing the two antenna elements to collaborate to operate like a single dipole antenna.

According to the configuration, similar to the fourth invention, the high-frequency current concentrates on the two antenna elements. As a result, only small amounts of excited, high-frequency currents flow in the circuit board, various components on the circuit board, a wire harness connected to the circuit board, and other periphery parts. Consequently, resistance components of the periphery parts consume the high-frequency energy, thereby suppressing a decrease in the radiation efficiency of the antenna.

A wireless communication device of a sixth invention may have, in addition to the configuration of one of the second to fifth inventions, a configuration in which the circuit board has a single ground point electrically connected to the housing.

According to this configuration, the circuit board is connected at the single ground point to the housing. When a high-frequency current flows in the circuit board, the circuit board oscillates with a high-frequency amplitude, relative to the housing. As a result, not only the antenna elements but also the circuit board radiates a radio wave, thereby improving the radiation efficiency. In other words, the antenna elements and the circuit board collaborate to operate like a large-sized antenna, thereby improving the radiation efficiency.

A wireless communication device of a seventh invention may have, in addition to the configuration of the sixth invention, a configuration in which the single ground point is positioned closer to feeding points of the first antenna element and the second antenna element.

According to this configuration, high-frequency current flows in the housing, thereby causing the entire wireless communication device, including the housing, to act as an antenna. Thus, the configuration provides improved radiation efficiency.

A wireless communication device of an eighth invention may have, in addition to the configuration of one of the second to seventh inventions, a configuration in which the housing has a surface with an opening, the circuit board has a first end and a second end, the first end including a feeding point electrically connected to the feed circuit. A distance between the first end and an end of the opening closer to the first end is shorter than a distance between the second end and an other end of the opening closer to the second end.

According to this configuration, the end of the circuit board which is away from the feeding points is positioned at a long distance away from the housing. When electric power is supplied to the first antenna element or the second antenna element, a high-frequency current is excited on the circuit board so that a large voltage amplitude is generated on the end of circuit board which is away from the feeding points. When this end of the circuit board is positioned closer to the housing, reverse current flows in the housing, thereby causing a phenomenon in which the reverse current cancels out the voltage amplitude. However, this configuration in which the end of the circuit board is positioned at a long distance away from the housing enables the circuit board to radiate a strong radio wave. In this way, it is possible to improve the radiation efficiency of the entire wireless communication device, including the antenna.

INDUSTRIAL APPLICABILITY

As described above, the wireless communication device according to the present invention, which is applicable to a fluid meter connected to a fluid pipe. In this wireless communication device, a direction of a plane of polarization of a radio wave radiated from a built-in antenna is orthogonal to the fluid pipe. Thus, the radio wave propagates in the rear surface direction of a meter without being reflected by the fluid pipe. Consequently, it is possible to provide improved radiation directivity.

REFERENCE MARKS IN THE DRAWINGS

1: housing
2: fluid pipe
3: flow-rate measuring unit
4: first antenna element
5: second antenna element
6: circuit board
7: node
8: switch
9: impedance adjustor
10: wireless circuit

The invention claimed is:

1. A wireless communication device comprising: a flow-rate measuring unit connected to a fluid pipe;
a first antenna element that transmits and receives a radio wave, the first antenna element having a longer side orthogonal to an axis of the fluid pipe;
a housing that accommodates the flow-rate measuring unit and
a circuit board including the first antenna element, wherein
the housing has a surface that the fluid pipe penetrates, and the first antenna element is positioned on a side of the circuit board closer to the surface of the housing that the fluid pipe penetrates;
the circuit board includes a second antenna element that has a longer side orthogonal to the longer side of the first antenna element,
the circuit board has a single ground point electrically connected to the housing, and
a first distance from the single ground point to a feeding point of the first antenna element and a second distance from the single ground point to a feeding point of the second antenna element are both set to be less than or equal to one fourth of a wavelength of the radio wave emitted from one of the antenna elements.

2. The wireless communication device according to claim 1, further comprising: a feed circuit that supplies high-frequency power to one of the first antenna element and the second antenna element; and a switch that electrically connects the one of the first antenna element and the second antenna element to the feed circuit and electrically connects another one of the first antenna element and the second antenna element to ground.

3. The wireless communication device according to claim 2, wherein the housing has a surface with an opening, the circuit board has a first end and a second end, the first end including a feeding point electrically connected to the feed circuit, and a distance between the first end and an end of the opening closer to the first end is shorter than a distance between the second end and an other end of the opening closer to the second end.

4. The wireless communication device according to claim 1, further comprising a feed circuit that supplies high-frequency power to one of the first antenna element and the second antenna element, wherein the one of the first antenna element and the second antenna element is electrically connected to the feed circuit, and another one of the first antenna element and the second antenna element is electrically connected to ground via an impedance adjustor.

5. The wireless communication device according to claim 1, wherein distances from the single ground point to a feeding point of the first antenna element and a feeding point of the second antenna element are set to be less than or equal to one eighth of a wavelength of the radio wave emitted from one of the antenna elements.

6. The wireless communication device according to claim 1, wherein a distance between the feeding points of the first antenna element and the second antenna element is less than or equal to one fourth of a wavelength of the radio wave emitted from one of the antenna elements.

7. The wireless communication device according to claim 1, wherein a distance between the feeding points of the first antenna element and the second antenna element is less than or equal to one eighth of a wavelength of the radio wave emitted from one of the antenna elements.

* * * * *